(12) United States Patent
Cohen

(10) Patent No.: US 6,564,754 B1
(45) Date of Patent: May 20, 2003

(54) SHOCK ABSORBING HARNESS SYSTEM

(76) Inventor: Jeremy Cohen, 1219 W. 6th Ave., Anchorage, AK (US) 99501

( * ) Notice: Subject to any disclaimer, the term of this patent is extended or adjusted under 35 U.S.C. 154(b) by 0 days.

(21) Appl. No.: 10/122,833

(22) Filed: Apr. 12, 2002

(51) Int. Cl.⁷ ............................................. A01K 27/00
(52) U.S. Cl. ........................... 119/856; 119/792; 54/24
(58) Field of Search ................................ 119/767, 770, 119/792, 793, 795, 798, 856, 858, 863, 865, 702, 712; D30/151, 152, 153, 154; 54/25, 19.3, 18.1

(56) References Cited

U.S. PATENT DOCUMENTS

| | | | | |
|---|---|---|---|---|
| 2,826,172 A | * | 3/1958 | Buckle et al. | 119/792 |
| 3,310,034 A | * | 3/1967 | Dishart | 119/771 |
| D245,350 S | * | 8/1977 | Geary | D30/152 |
| 4,060,056 A | * | 11/1977 | Maietta | 119/793 |
| D293,139 S | * | 12/1987 | Roa | D30/152 |
| 4,964,369 A | * | 10/1990 | Sporn | 119/818 |
| 5,511,515 A | * | 4/1996 | Brown et al. | 119/771 |
| 5,706,764 A | * | 1/1998 | Irbinskas | 119/792 |
| 6,167,844 B1 | * | 1/2001 | Cantrell et al. | 119/792 |
| 6,354,247 B1 | * | 3/2002 | Andrews | 119/816 |
| 6,401,666 B1 | * | 6/2002 | Kircher | 119/792 |

* cited by examiner

Primary Examiner—Peter M. Poon
Assistant Examiner—Susan Piascik
(74) Attorney, Agent, or Firm—Michael Tavella

(57) ABSTRACT

A multi-directional, dynamic, and self-equalizing shock-absorbing harness system for small animals. The system has a collar, to which a length of elastic, or shock, cord is attached. The length of shock cord connects to a ring, through which passes a second shock cord that is generally perpendicular to the first shock cord. The second shock cord is attached to a body strap. A standard leash is then attached to the ring. In this way, the system is able to spread the energy of violent pulling on the leash. This energy is absorbed by the shock cords and is dissipated over the animal's body. Moreover, because the system is self-equalizing, it better enables the handler to keep the animal in proper position, making handling the pet easier.

17 Claims, 9 Drawing Sheets

SHOCK ABSORBING HARNESS SYSTEM

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to animal harnesses and particularly to shock absorbing animal harness systems.

2. Description of the Prior Art

For many years, small pets such as dogs have been controlled by leashes. A leash is typically a length of rope or leather that has a handle on one end and a clip on the other. The leash is typically attached to a collar that fits around the pet's neck. The problem with this arrangement is that when the pet pulls on the leash, it often results in choking the animal as well as putting unnecessary strain on the animal's neck and shoulder muscles. Harnesses have been developed for use with working animals. These harnesses apply pressure to the back and shoulders of the animal and do not tend to choke the animal. However, again, if the animal suddenly strains against the leash, it can be injured. Most pet owners do not keep their pets in a harness. Collars are preferred because they can be used to hold identification for the animal and collars tend to look better, and easier than a large harness to put on the animal.

To prevent injury to pets from choking or strain, shock-absorbing leashes have been designed. These leashes do not prevent choking; however, they do lessen the jolt experienced by the animal when it pulls on the leash. Examples of these designs are found in the following U.S. Patents: U.S. Pat. No. 2,275,701 to Taylor discloses a leash that has a tube attached to one end of a leather strap. The tube is fitted with a length of elastic shock cord. One end of the elastic cord is attached to the strap. As an animal pulls on the leash, the shock cord stretches and contracts to absorb any minor jolts caused by the animal's movement. There is a device built into the tube that limits the movement of the shock cord to prevent excessive stretching of the cord. U.S. Pat. Nos. 5,146,876 and 5,873,328 disclose devices that have a first non-elastic strap, and a second elastic strap position in parallel. As tension is applied to the leashes, the elastic portion stretches until its limit is reached. U.S. Pat. No. 5,706,764 discloses a leash that has a non-elastic portion and an elastic portion is series. Unlike the Taylor Patent, there is no tube used to control the movement of the elastic portion. Finally, U.S. Pat. No. 6,053,129 discloses a leash similar to Taylor's in that it uses a tube to hold a length of elastic shock cord to absorb shock caused by the animal's movement.

Although of these devices are improvements over a straight leash, they still apply all of the force of the leash onto the neck of the animal. As mentioned above, harnesses may be used to spread out the load, but most harnesses are made of rigid material and, used with the elastic leashes, are not optimally suited to cushion the impact of strain placed on the animal's body.

BRIEF DESCRIPTION OF THE INVENTION

The instant invention solves all of these problems. The invention is a multi-directional, dynamic, and self-equalizing shock-absorbing harness system for small animals. The system has a "harness portion" that uses a neck collar and a body strap, which can be connected in many different variations. The key to the system, however, is the shock cord configuration. One end of the lateral shock cord attaches to a loop formed on the collar part of the harness portion. This shock cord passes backwards and connects to a ring, through which, passes a second shock cord that is generally perpendicular to the first shock cord. The second shock cord is attached to loops on the body strap portion of the harness portion. A standard leash is then attached to the rear ring.

Because the leash is attached to the shock cords, instead of the body harness directly, the energy of violent pulling on the leash is absorbed by the shock cords and is, in turn, spread over the dog's body. Moreover, because the ring slides over the second length of shock cord, the force is transferred equally, regardless of the animal's direction of pull. This enables the leash to be self-equalizing and multi directional. This ability better enables a handler to keep the animal in proper position. It also reduces strain on the handler, making the job of handling the animal easier.

There are several variations of how the shock cords and harness system can be constructed. For example, one design uses adjustable straps and quick disconnect fasteners to form the harness portion of the system. Another design uses elastic bands to form the harness portion of the system. The collar and body strap may be connected by a strap running along the belly, and/or the back, of the animal. Finally, the configuration for the first and second shock cords can be varied in many different ways as well.

It is an object of this invention to produce a shock absorbing harness system for small animals.

It is another object of this invention to produce a shock absorbing harness system that reduces strain on the animal's neck and shoulders.

It is yet another object of this invention to produce a shock absorbing harness system that can be easily placed on an animal.

It is another object of this invention to produce a shock absorbing harness system that has the ability to align forces of tension along one single axis.

It is yet a further object of this invention to produce a shock absorbing harness system that reduces strain on the animal's handler during use.

DETAILED DESCRIPTION OF THE INVENTION

Figure 1:
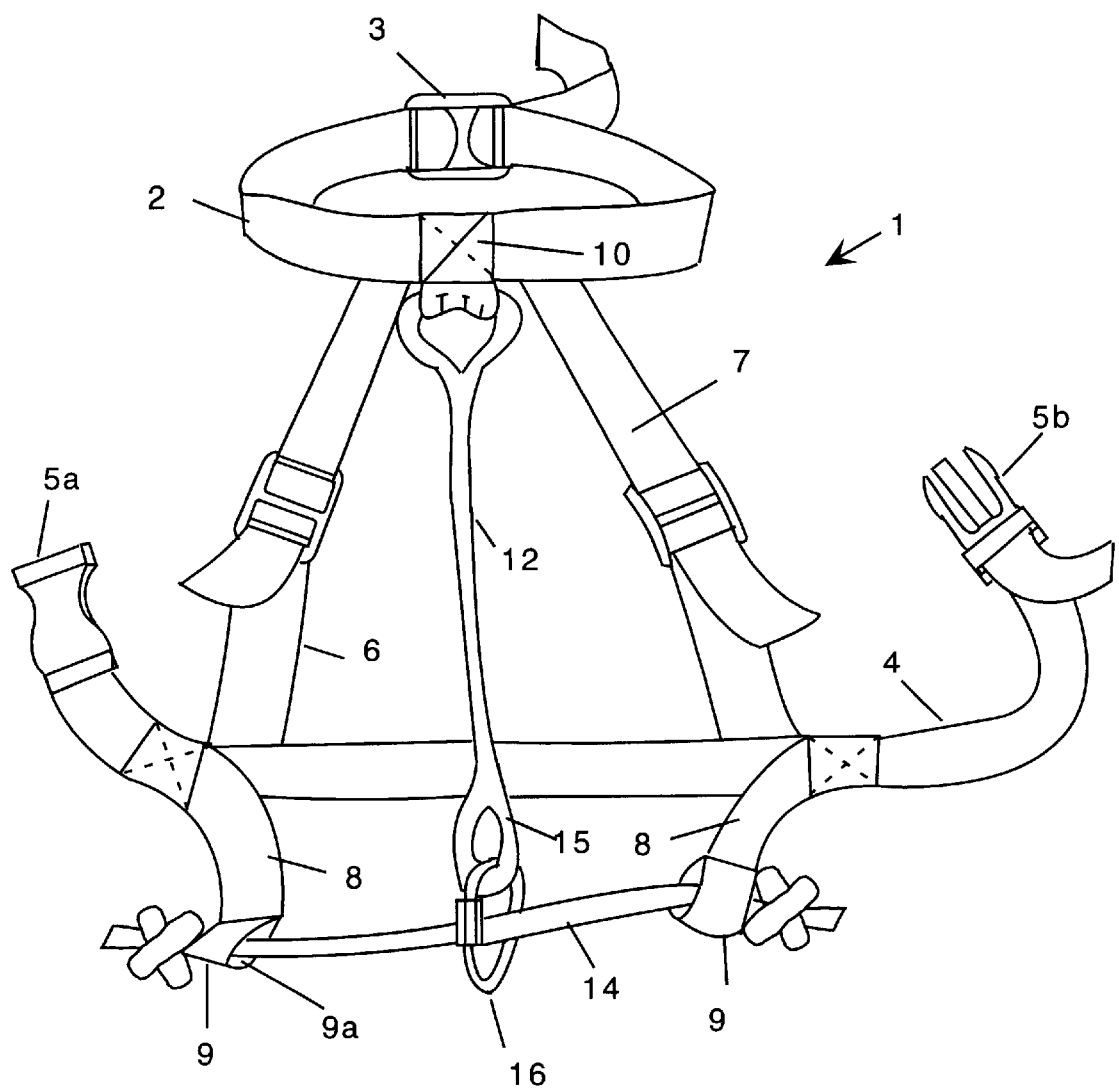
FIG. 1 is a top view of the first embodiment of the invention.

Referring now to FIG. 1, the first embodiment of the invention 1 is shown. As mentioned above, the invention is a multi-directional, dynamic, and self-equalizing shock-absorbing harness system for small animals. The system has a "harness portion" that uses a neck collar and a body strap, which can be connected in many different variations. The key to the system, however, is the shock cord configuration. One end of the lateral shock cord attaches to a loop formed on the collar part of the harness portion. This shock cord passes backwards and connects to a ring, through which passes a second shock cord that is generally perpendicular to the first shock cord. The second shock cord is attached to loops on the body strap portion of the harness portion. A standard leash is then attached to the rear ring. In this embodiment, the device 1 has a neck collar 2, made of strapping. The collar 2 has a quick release fastener 3 of the type common to the art. This embodiment also has a body strap 4 shown in the open position. The body strap 4 is also made of strapping and has quick release fastener parts 5a and 5b. Two adjustable back straps 6 and 7 are attached to both the neck collar 2 and the body strap 4 as shown. These straps join the collar and body strap together to make a body harness. As shown in FIG. 1, the body strap 4 has two straps 8 that extend away from the body strap 4. These straps are sewn to the body strap using standard techniques known in the art. The ends 9 of the straps 8 are formed into loops 9a as shown.

The neck collar 2 also has a loop 10 sewn into it as shown. A first length of shock cord 12 is attached to the loop 10 as shown. The shock cord 12 extends back to the body strap 4 where it connects to the ring 16. As shown in FIG. 1, a second length of shock cord 14 is run between the loops 9a. This cord can be knotted or otherwise secured to the loops using techniques known in the art. The distal end of the shock cord 12 is fitted with a loop 15 as shown. A ring 16 passes through the loop 15 as shown. The ring can be solid or can be removable, as desired. The ring is also fitted over the second length of shock cord 14 so that the ring is free to slide along the cord 14. The ring is large enough to allow a leash to attach to it so that a pet's owner can safely handle the animal.

One of the nice features of the system is its ability to adjust the shock cords to reach a "critical distance" so that the amount of force can be balanced between the animal's body and neck. This can be done by adjusting the length of the shock cords using knots, or by adding strap adjustments that are common to the art.

Figure 2:
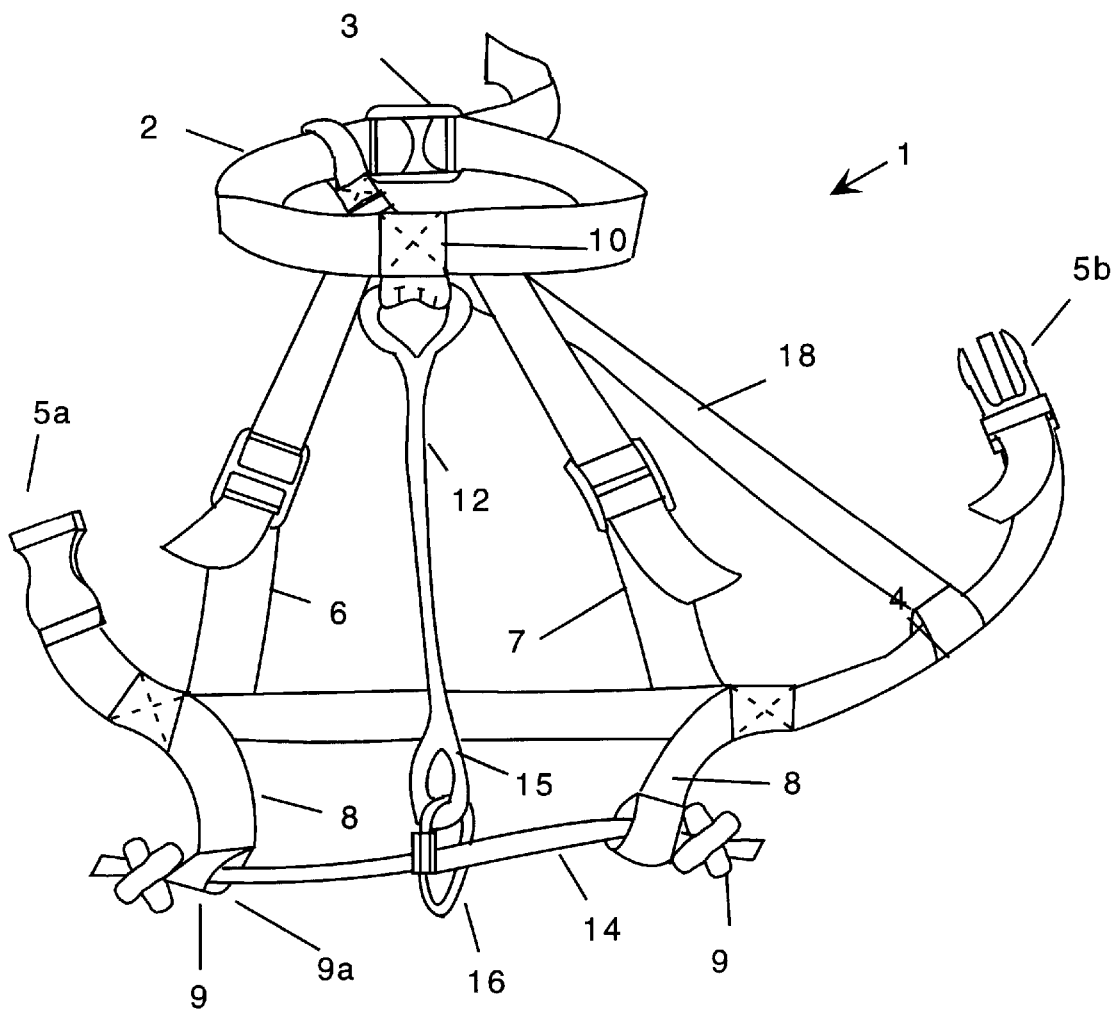
FIG. 2 is a top view of the first embodiment of the invention showing an optional belly strap.

FIG. 2 shows the first embodiment as before with the addition of a belly strap 18. The belly strap 18 is used to further spread the tension load of the harness so that it is more comfortable for the animal. In all other respects, the variation shown in FIG. 2 is identical to that of FIG. 1.

Figure 3:
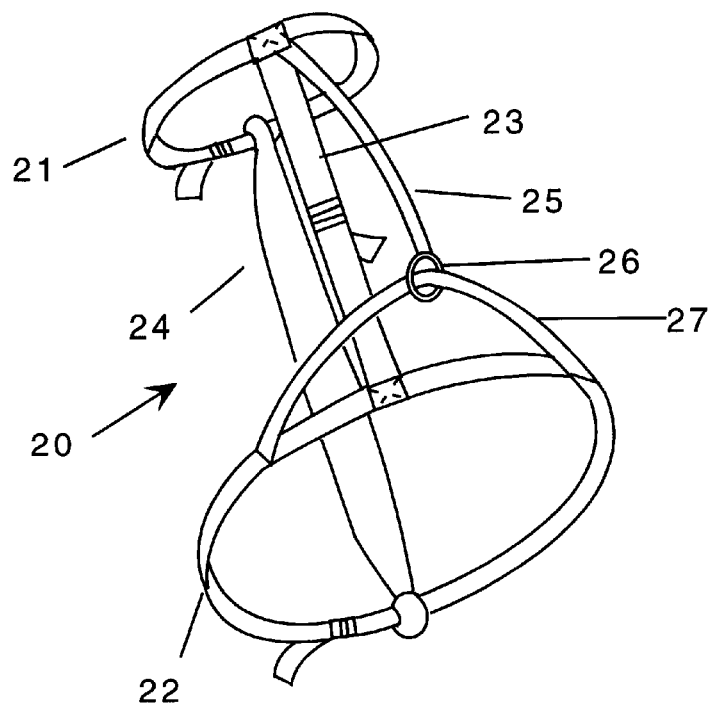
FIG. 3 is a detail view of a second embodiment of the invention.

FIGS. 3–8 show a second embodiment and its variations. FIG. 3 shows the device 20 having a neck collar 21 and a body strap 22 as before. The adjustable harness straps 6 and 7 are not used in this embodiment. Instead, a single adjustable strap 23 runs along the top of the harness and a wide padded belly strap 24 connects the bottom of the harness. The five variations all involve the configuration of the shock cords. In FIG. 3, the shock cords are configured as in the first embodiment. A first shock cord 25 is affixed to the neck and has a ring 26 attached to its distal end. A second shock cord 27 is affixed to the body strap 22 and passes through the ring 26.

Figure 4:
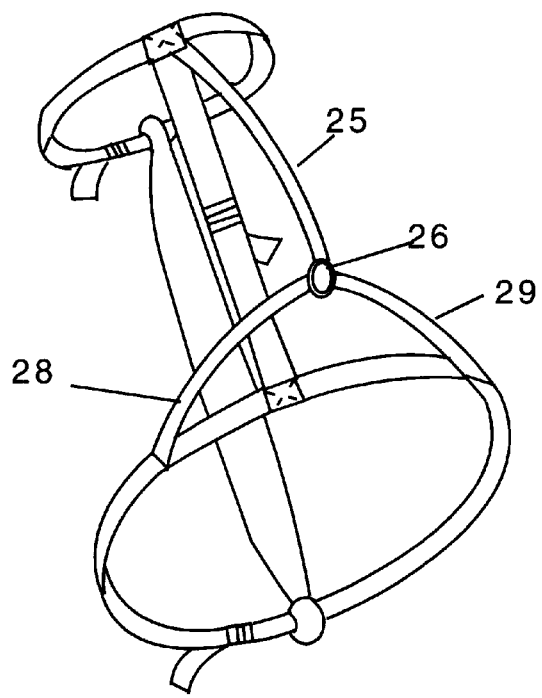
FIG. 4 is a detail view of a modification of the second embodiment.

In the variation of FIG. 4, the first shock cord 25 is attached to the neck as before. It is also attached to ring 26. The second shock cord is actually two lengths of cord 28 and 29. Here, one end of the cords 28 and 29 are attached to the body strap and the other ends of the cords 28 and 29 are attached to the ring 26. Thus, in this variation, the ring 26 does not slide on the second length of shock cord.

Figure 5:
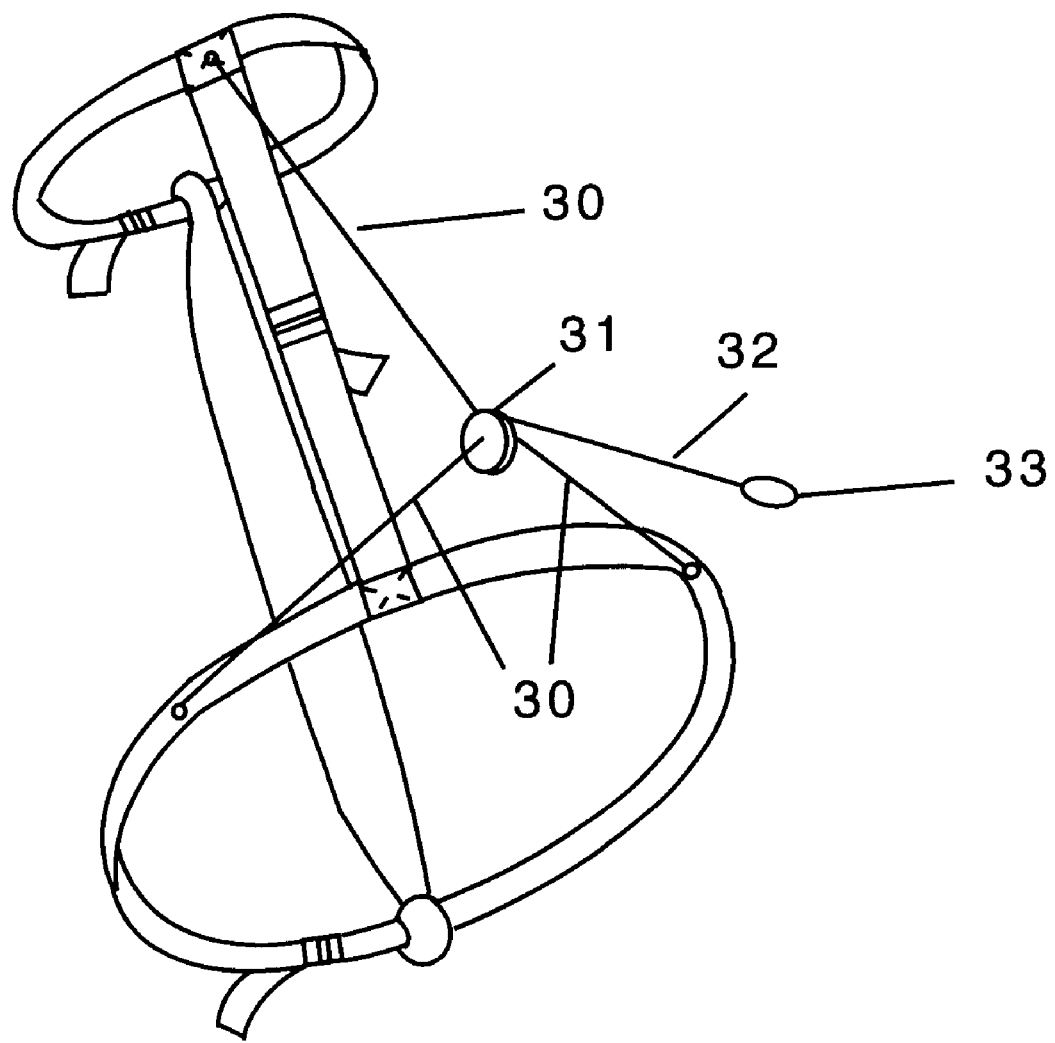
FIG. 5 is a detail view of a second modification of the second embodiment.

The variation of FIG. 5 has the same harness structure as before. Here, three lengths of shock cord 30 are affixed to the harness as shown. Their ends are attached to a reel 31. A length of leash cord 32 is encased in the reel, which extends when pulled. The reel is has an automatic retraction feature to adjust the length of leash 32 as desired. A handle 33 is attached to allow the user to hold the leash comfortably.

Figure 6:
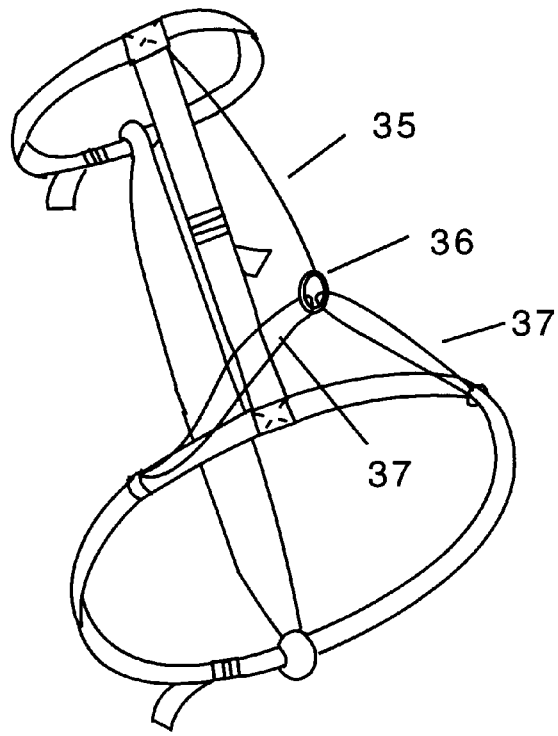
FIG. 6 is a detail view of a third modification of the second embodiment.

FIG. 6 shows yet another variation of this structure. In this variation, a first shock cord 35 is attached to the neck collar and a ring 36 as shown. Two additional shock cords 37 are attached to the harness. Each of these cords is doubled over to form a loop. Each loop is passed through the ring 36. A leash can be attached to the ring 36 so that the device can be used as before.

Figure 7:
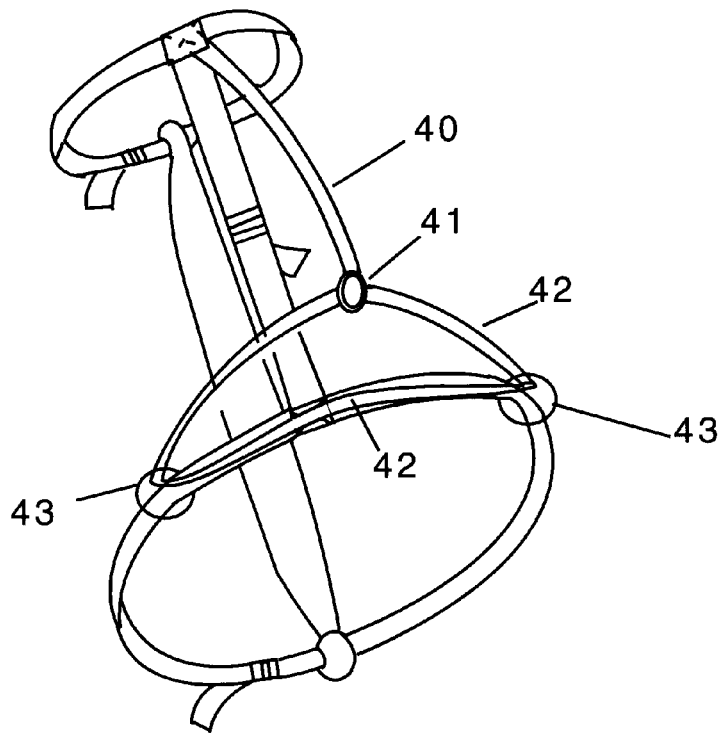
FIG. 7 is a detail view of a fourth modification of the second embodiment.

The variation of FIG. 7 shows a harness that has a first shock cord 40 that is attached to the neck collar and a ring 41 as shown. This variation has a single second length of shock cord 42 that passes through two rings 43 that are attached to the harness. The length of cord 42 runs along the top of the back strap as shown, where it is fixed in place.

Figure 8:
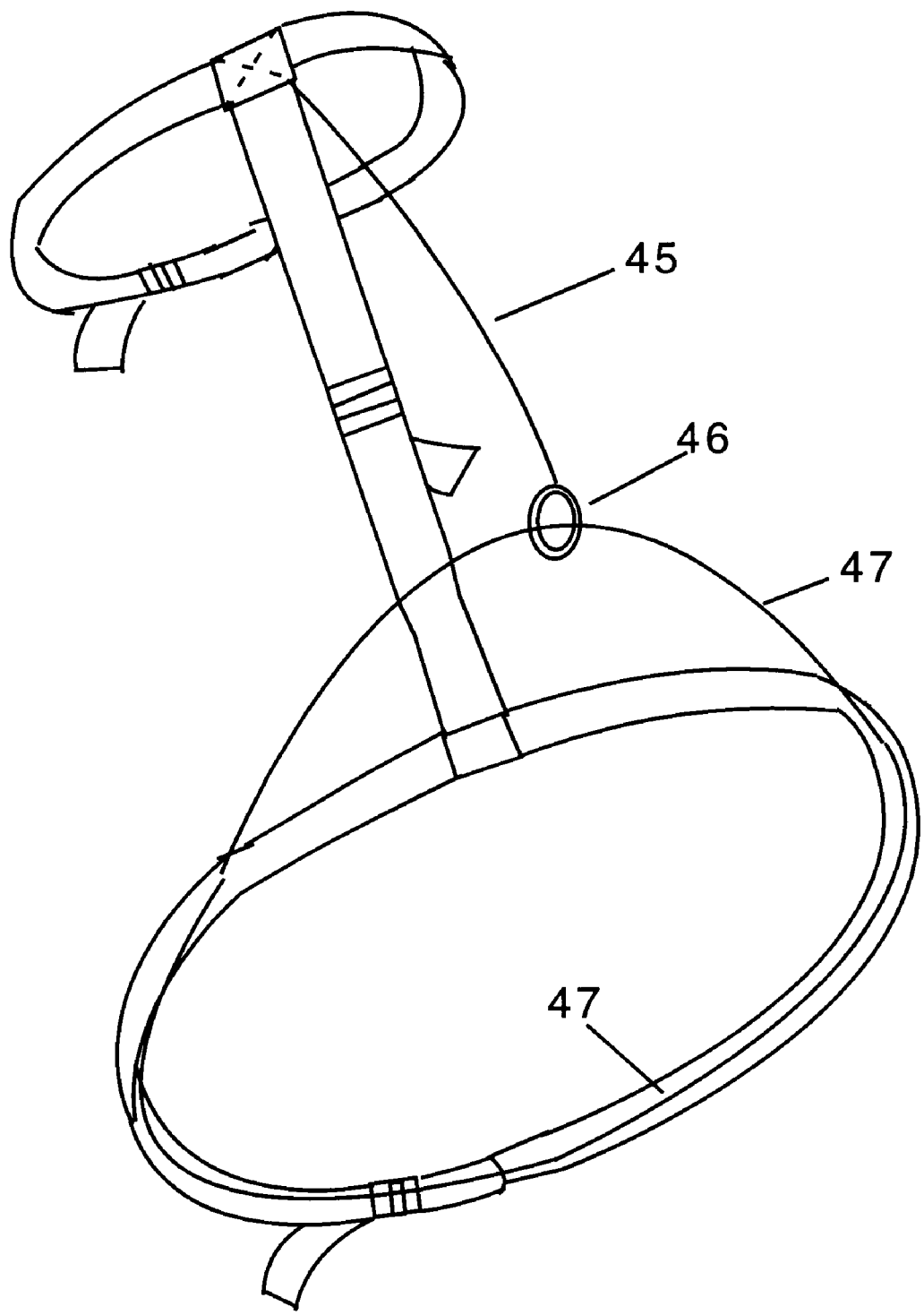
FIG. 8 is a detail view of a fifth modification of the second embodiment.

FIG. 8 shows the final variation of this embodiment. It has a harness that has a first shock cord 45 that is attached to the neck collar and a ring 46 as shown. This variation has a single second length of shock cord 47 that passes through ring 46 as shown. This length of cord 47 then runs along the bottom of the back strap as shown, where it is fixed in place.

Figure 9:
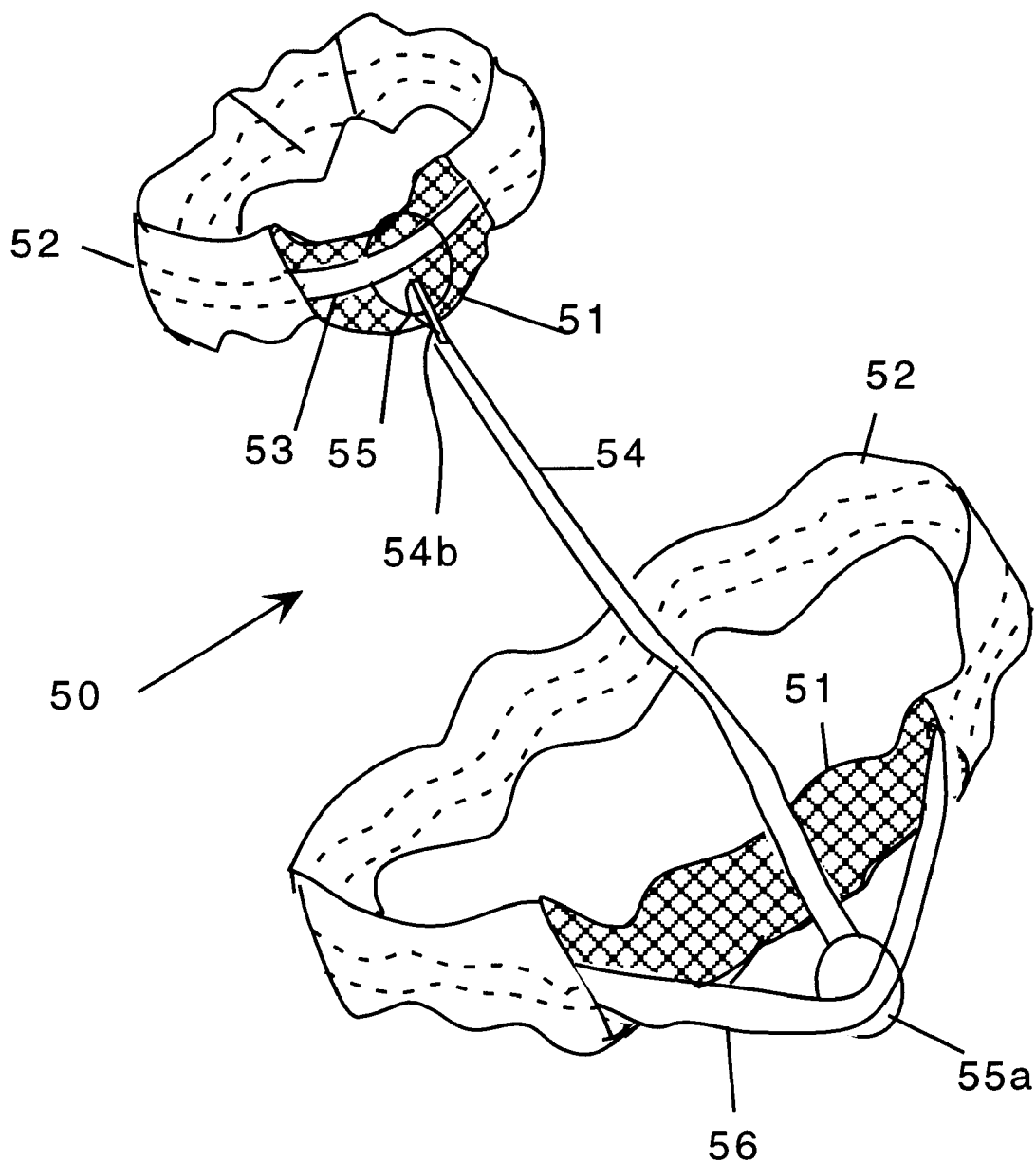
FIG. 9 is a detail view of a third embodiment of the invention.

FIG. 9 shows a third embodiment of the device. This embodiment 50 uses elastic bands for the collar and body strap. These bands have a length of elastic strapping 51 that is covered by a cloth, leather, or nylon cover 52 for comfort. A shock cord 53 is attached to the ring 55 on the neck portion as shown. A length of shock cord 54 is attached to the ring 55 using a spring clip 54b, and extends back as shown. Note that in this view, the shock cord 54 is attached to the ring 55 with a detachable spring clip 54b. This clip, or any equivalent, thereof, is used to allow the collar to be left on the animal, if desired. Note also that, although this feature is shown on this particular figure, the use of a detachable clip can be used on any of the other embodiments using techniques that are well known in the art.

The end of the cord 54 has a ring 55a attached to it as shown. A length of shock cord 56 is attached to the back strap as shown. This cord passes through the ring 55b so that the ring is free to slide along the cord 56 similar to that of the embodiment of FIG. 1.

Figure 9A:
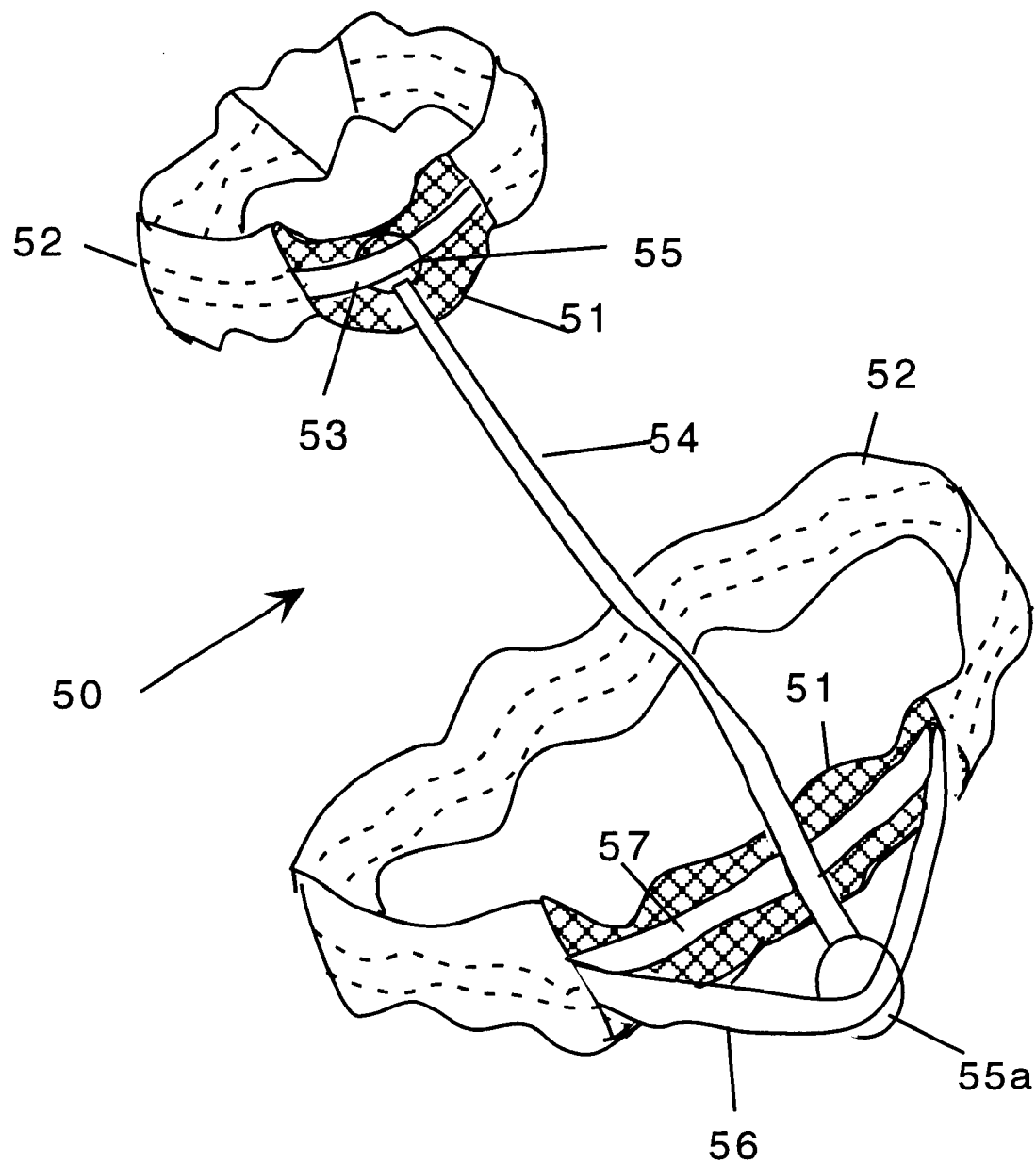
FIG. 9a is a detail view of a modification of the third embodiment of the invention.

FIG. 9a shows an alternative to the third embodiment. In this view, the device is essentially the same. It has elastic bands for the collar and body strap. These bands have a length of elastic strapping 51 that is covered by a cloth, leather, or nylon cover 52 for comfort. A shock cord 53 is attached to the neck portion as shown. A length of shock cord 54 is attached to the ring, as before, and extends back as shown. The end of the cord 54 has a ring 55a attached to it as shown. A length of shock cord 56 is attached to the back strap as shown. This cord passes through the ring 55a so that the ring is free to slide along the cord 56 similar to that of the embodiment of FIG. 1. It also has a strip of elastic 57 that wraps around the animal's body. This additional elastic strip is used to cinch around the animal when the leash is pulled, thereby tempering the shock even more.

Figure 10:
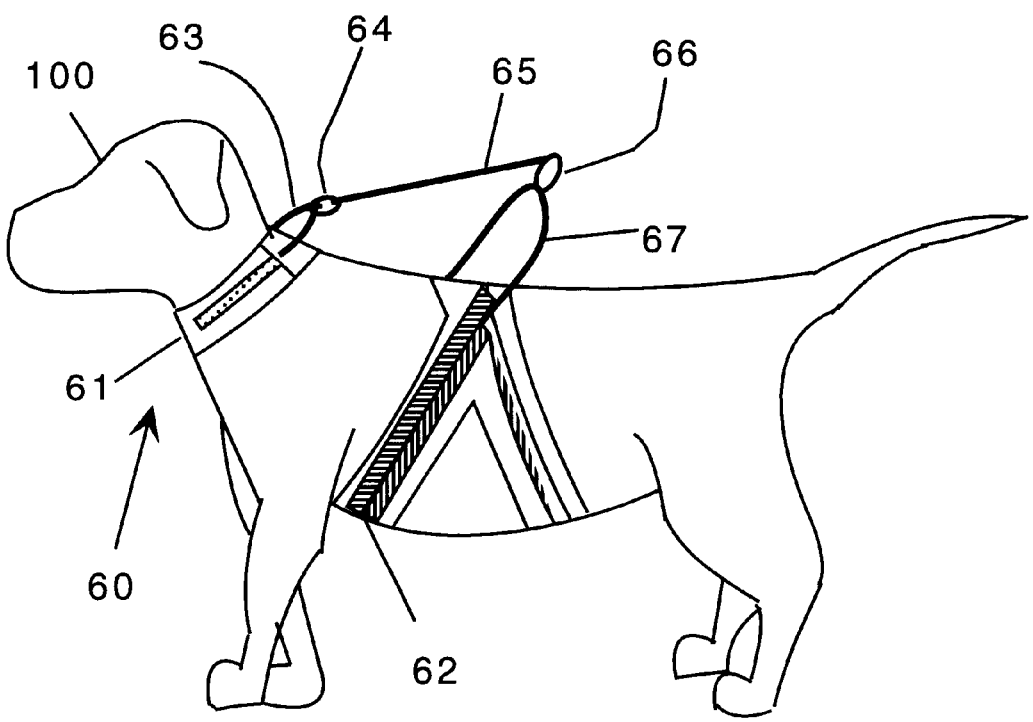
FIG. 10 is a detail view of a fifth embodiment of the invention in place on a dog.
Figure 11:
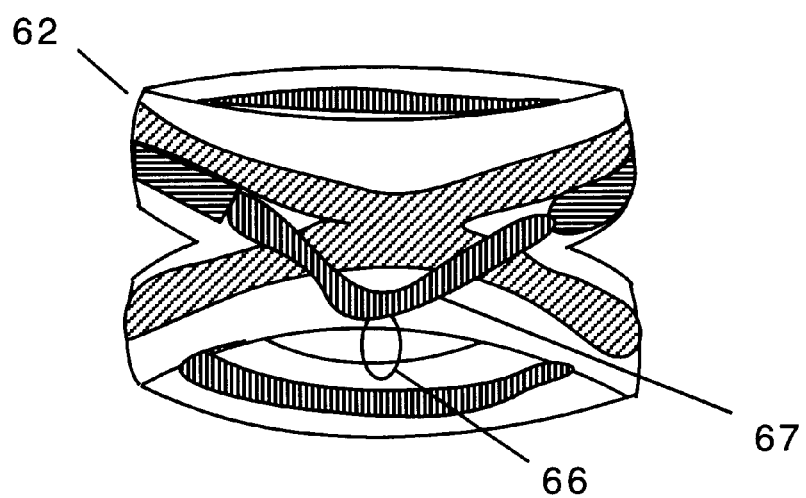
FIG. 11 is a detail view of the body strap portion of the fifth embodiment.

FIGS. 10 and 11 show the preferred embodiment 60. In this embodiment, a neck collar 61 is attached to a dog 100 as shown. A separate body harness 62 is placed over the dog's body. This body harness 62 uses elastic cords that cinch around the animal's mid section in an "X" pattern. The design cinches both forward and backward, while the overall force pulls backward to restrain the animal. In this embodiment a length of shock cord 63 is attached to the neck collar 61. A ring 64 is attached to this cord. A second cord 65 attached to the ring 64 and extends back to a second ring 66 as shown. A third length of shock cord 67 is attached to the back strap 62 and passes through ring 66 as shown. This embodiment is used in the same manner as the other embodiments in that a leash is attached to ring 66 and is held by the user.

This embodiment is preferred because it is simple in design and provides the optimum use of cinching bands to help spread the force of the pull. As noted above, the "X" band in the body portion acts to cinch in both directions. The other embodiments lack this ability. Moreover, it is also one if the simpler and easier designs to put on and take off the animal.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A harness system for small animals comprising:
   a) a neck collar;
   b) a body strap;
   c) a first resilient shock cord, having a proximate end and a distal end, wherein the proximate end of said resilient shock cord is fixedly attached to said neck collar;
   d) a ring, attached to the distal end of said first shock cord;
   e) a second resilient shock cord having a first end and a second end and a center portion wherein the first end and the second end of said second resilient shock cord are fixedly attached to said body strap and further wherein the center portion of said second resilient shock cord passes through said ring.

2. The harness system of claim 1 wherein the neck collar and body strap have buckles attached thereto so that said neck collar and said body strap can be opened and closed when being positioned on or being removed from an animal.

3. The harness system of claim 1 wherein the means for connecting said neck collar to said body strap comprise a pair of straps, each of said pair of straps being attached to said neck collar and said body strap.

4. The harness system of claim 1 further comprising a means for connecting said neck collar to said body strap.

5. The harness system of claim 4 wherein the means for connecting said neck collar to said body strap comprise a single strap being attached to the neck collar and the body strap such that the single strap is positioned under the body of the animal.

6. The harness system of claim 4 wherein the means for connecting said neck collar to said body strap comprise a single strap being attached to the neck collar and the body strap such that the single strap is positioned above the body of the animal, such that the strap lies on the animal's back when in position on the animal.

7. The harness of claim 3 wherein each of said pair of straps is adjustable.

8. The harness of claim 5 wherein the single strap is adjustable.

9. A harness system for small animals comprising:
   a) a neck collar;
   b) a body strap;
   c) a first resilient shock cord, having a proximate end and a distal end, wherein the proximate end of said resilient shock cord is fixedly attached to said neck collar;
   d) a ring, attached to the distal end of said first shock cord;
   e) a second resilient shock cord having a first end and a second end, wherein the first end of said second resilient shock cord is fixedly attached to said body strap and further wherein the second end of said second resilient shock cord is attached to said ring;
   f) a third resilient shock cord having a first end and a second end, wherein the first end of said third resilient shock cord is fixedly attached to said body strap and further wherein the second end of said third resilient shock cord is attached to said ring.

10. The harness system of claim 9 wherein the second and third shock cords are doubled over to form a pair of loops.

11. The harness system of claim 9 wherein the neck collar and body strap have buckles attached thereto so that said neck strap and said body strap can be opened and closed when being positioned on or being removed from an animal.

12. The harness system of claim 9 wherein the means for connecting said neck collar to said body strap comprise a pair of straps, each of said pair of straps being attached to said neck collar and said body strap.

13. The harness system of claim 9 further comprising a means for connecting said neck collar to said body strap.

14. The harness system of claim 13 wherein the means for connecting said neck collar to said body strap comprise a single strap being attached to the neck collar and the body strap such that the single strap is positioned under the body of the animal.

15. The harness system of claim 13 wherein the means for connecting said neck collar to said body strap comprise a single strap being attached to the neck collar and the body strap such that the single strap is positioned above the body of the animal, such that the strap lies on the animal's back when in position on the animal.

16. The harness of claim 12 wherein each of said pair of straps is adjustable.

17. The harness of claim 14 wherein the single strap is adjustable.

* * * * *